US009679478B2

(12) United States Patent
Wu et al.

(10) Patent No.: US 9,679,478 B2
(45) Date of Patent: Jun. 13, 2017

(54) ONLINE TRAFFIC VOLUME MONITORING SYSTEM AND METHOD BASED ON PHASE-SENSITIVE OPTICAL TIME DOMAIN REFLECTOMETRY

(71) Applicant: University of Electronic Science and Technology of China, Chengdu, Sichuan (CN)

(72) Inventors: Huijuan Wu, Sichuan (CN); Yunjiang Rao, Sichuan (CN); Ya Qian, Sichuan (CN); Hanyu Li, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 45 days.

(21) Appl. No.: 14/694,984

(22) Filed: Apr. 23, 2015

(65) Prior Publication Data

US 2016/0275788 A1 Sep. 22, 2016

(30) Foreign Application Priority Data

Mar. 16, 2015 (CN) .......................... 2015 1 0114129

(51) Int. Cl.
*G08G 1/04* (2006.01)
*H04L 12/26* (2006.01)
*G08G 1/02* (2006.01)

(52) U.S. Cl.
CPC ................ *G08G 1/04* (2013.01); *G08G 1/02* (2013.01)

(58) Field of Classification Search
CPC combination set(s) only.
See application file for complete search history.

*Primary Examiner* — Brian Zimmerman
*Assistant Examiner* — Cal Eustaquio

(57) ABSTRACT

An online traffic volume monitoring system based on a phase-sensitive optical time domain reflectometry and its monitoring method are related to a field of intelligent transportation and an application of distributed fiber sensing. A vehicle moving temporal-spatial response graph is generated by accumulating differentiated Optical Time-Domain Reflectometry tracks at different moments in one unit monitoring period for traffic volume statistics, and then converted into a vehicle moving trajectory image through binarization and image pre-processing. Parameters of the moving vehicles are detected by utilizing a search-match method. A traffic volume, moving speeds, moving directions and locations are obtained respectively from detected trajectory number, and a tilt angle and pixel positions. The monitoring method is helpful to solve traffic congestion problem and informing drivers of real-time traffic volume, and contributes to realize an intelligent city traffic regulation.

8 Claims, 5 Drawing Sheets

ONLINE TRAFFIC VOLUME MONITORING SYSTEM AND METHOD BASED ON PHASE-SENSITIVE OPTICAL TIME DOMAIN REFLECTOMETRY

CROSS REFERENCE OF RELATED APPLICATION

This invention claims priority under 35 U.S.C. 119(a-d) to CN 201510114129.X, filed Mar. 16, 2015.

BACKGROUND OF THE PRESENT INVENTION

Field of Invention

The present invention relates to an intelligent transportation field, and more particularly to an online traffic volume monitoring system based on a phase-sensitive optical time domain reflectometry and a monitoring method thereof.

Description of Related Arts

With the improvement of people's living standards, private vehicles have increased dramatically. Traffic jams occurring on roads in each city or town during rush hours and holidays bring great inconvenience in people's daily life. As a result, it is an urgent and important issue to monitor the vehicle flow and the traffic situation on line in cities to guide traffic orderly, avoid congestion, and realize an intelligent traffic control. The online vehicle flow monitoring is one of the key technologies for intelligent traffic management, which provides real-time and accurate information for the transportation administrations and the vehicle owners by detecting the vehicle flow at different road segments and intersections, and solves a series of problems that congestion brings. The conventional vehicle flow detection technology is mainly based on video surveillance (CN 1024199906 A, 2012), which detects and counts the vehicle targets in continuous video stream through the image acquisition and analysis. However, the video surveillance technology depends highly on the light condition of the background. The image quality of the video deteriorates significantly at night when it is lacking of light, and the accuracy of recognition declines. The infrared detection technology depends much less on light condition. However, in order to enhance the sensitivity, the output power of the infrared detection system needs to be increased by sacrificing the long-term stability (CN 1967623 A, 2006). The monitoring technology based on the Internet of Things by using the electronic sensor network (CN 103578280 A, 2014) has some advantages of responding in real time with a simple detecting method, but still has difficulties in battery replacement and long-term maintenance, especially the difficulty that hundreds of, even thousands of, sensor nodes are needed when monitoring a wide area or a long road.

SUMMARY OF THE PRESENT INVENTION

The present invention provides an online traffic volume monitoring system based on a phase-sensitive optical time domain reflectometry and a method thereof, for providing helpful information about real-time traffic condition to transportation administrations and drivers, so as to avoid traffic congestion in time.

Accordingly, the present invention adopts the following technical solutions. An online traffic volume monitoring system based on a phase-sensitive optical time domain reflectometry comprises: sensing fiber cables buried along a road, a phase-sensitive optical time domain reflectometry (Φ-OTDR), and a signal processing unit. The Φ-OTDR comprises an ultra-narrow line-width laser, an acousto-optic modulator (AOM), an erbium-doped fiber amplifier (EDFA), an optical isolator, a circulator, an optical filter, a photoelectric detector (PD), an analog-digital converter (ADC) and a waveform generator. The ultra-narrow line-width laser generates a continuous coherent light; the AOM modulates the continuous coherent light into an optical pulse signal; the optical pulse signal is amplified by the EDFA and then gated into the sensing fiber cable through the optical isolator and the circulator from a first port to a second port. Rayleigh scattering light is generated when the optical pulse signal is transmitting through the sensing fiber cable, and the backscattered Rayleigh light returns through the second port to a third port of the circulator and then is filtered by the optical filter to eliminate system noises. After a photoelectric conversion by the PD, an analog optical time domain reflection signal is obtained and converted into a digital signal by the ADC. The digital signal is then transmitted into the signal processing unit through a network interface in real time. The waveform generator is for generating periodic pulse signals which are used as driving signals of the AOM for modulating the continuous coherent light, outputted by the ultra-narrow line-width laser, into the optical pulse signal, and also used as triggering signals of the ADC for periodically acquiring the optical time domain reflection signal simultaneously.

A monitoring method of the online traffic volume monitoring system based on the phase-sensitive optical time domain reflectometry, wherein: the sensing fiber cables are for detecting cable vibration caused by vehicles passing by alongside the whole fiber length; corresponding responses of the cable vibrations at different moments are accumulated at a temporal axis into a vehicle moving trajectory image; trajectories in the vehicle moving trajectory image are searched, detected and determined for parameters, so as to obtain a traffic volume, moving speeds, moving directions and locations of the vehicles;

the monitoring method comprises steps of:

(1) differentiating optical time domain reflection tracks at neighboring moments to obtain a response signal of vibrations caused by moving vehicles at a certain moment, accumulating the response signal within a period of time to obtain a vehicle moving temporal-spatial response graph which varies spatially and temporally;

(2) processing the vehicle moving temporal-spatial response graph within a unit statistic period of traffic volume with binarizing and pre-treatments which comprise an image denoising and a target enhancement, and then obtaining a vehicle moving trajectory image;

(3) at discontinuous pixel points in an arbitrary direction of the vehicle moving trajectory image, detecting all possible vehicle moving trajectories with a line searching and matching method; establishing a vehicle detection database with parameters of the detected vehicle moving trajectories; and (4) according to the parameters in the vehicle detection database, counting the traffic volume and calculating out actual moving speeds, actual moving directions, entry locations and exit locations of the vehicles on a road.

The step (1) comprises steps of:

differentiating the optical time domain reflection tracks, namely OTDR tracks, at the neighboring moments of a phase-sensitive optical time domain reflectometry to obtain a curve of responses of the vibrations caused by the vehicles moving or passing by along the sensing fiber cables at the moment; by accumulating the responses of the vibrations for the period of time, obtaining a two-dimensional matrix with temporal and spatial axes, namely the vehicle moving temporal-spatial response graph.

The step (2) comprises steps of:

according to different response amplitudes of the vibrations caused by the vehicles and noises, selecting an appropriate threshold according to amplitude of a background noise, converting the vehicle moving temporal-spatial response graph into a binary image; pre-processing the binary image with the image denoising, an edge sharpening and the target enhancement, so as to obtain the vehicle moving trajectory image.

The step of "at discontinuous pixel points in an arbitrary direction of the vehicle moving trajectory image, detecting all possible vehicle moving trajectories with a line searching and matching method" in the step (3) comprises steps of:

determining sizes of a horizontal axis and a vertical axis of the vehicle moving trajectory image according to a monitoring distance and a statistic time span, so as to obtain a two-dimensional vehicle moving trajectory image; according to the sizes of the horizontal axis and the vertical axis, searching moving trajectories in all possible directions within a range of the two-dimensional vehicle moving trajectory image; confirming whether there is a trajectory which matches with a preset matching condition in each searching direction; if yes, obtaining a confirmation result that there is the trajectory in the searching direction, and recording related parameters of the confirmed trajectory in the searching direction into the vehicle detection database, as results of the searching and the confirming of the trajectory.

Preferably, the step of searching the moving trajectories in all possible directions within the range of the two-dimensional vehicle moving trajectory image in the step (3) is shown as follows.

In the vehicle moving trajectory image, the horizontal axis represents a spatial distance d and the vertical axis represents a time t; the monitoring distance and the statistic time span form a rectangular window with four vertices A, B, C and D. The point A coincides with an origin of the axes; a side AB coincides with the horizontal axis of the spatial distance, and a side AD coincides with the vertical axis of the time. The side AB and sides BC, CD and DA (i.e., AD) are denoted as $l_1$, $l_2$, $l_3$ and $l_4$, respectively in the rectangular window ABCD. An extended line of the trajectory in an arbitrary direction in the image intersects with two of the sides AB, BC, CD and DA; however, an intersection of the trajectory with the two of the sides varies in the following six circumstances ($C_4^2=6$): I, intersecting with the sides $l_1$ and $l_2$; II, intersecting with the sides $l_2$ and $l_3$; III, intersecting with the sides $l_3$ and $l_4$; IV, intersecting with the sides $l_4$ and $l_1$; V, intersecting with the sides $l_1$ and $l_3$; VI, intersecting with the sides $l_2$ and $l_4$. According to the present invention, preferably, the step of searching the moving trajectories in all possible directions within the range of the two-dimensional vehicle moving trajectory image is executed counterclockwise in the above six circumstances, comprising steps of:

(a): supposing that a point P is an arbitrary pixel point of the side AB ($l_1$) ($P\in[A,B)$), setting the point P as a starting point of a searching line segment, wherein all pixel points of the side AB except the point B are selected and denoted as the point P, and connecting the point P to a pixel point M on the sides $l_2$ and $l_3$ as the searching line segment and a searching direction, wherein all the pixel points on the sides $l_2$ and $l_3$ are selected one by one counterclockwise, except the points B and D, and denoted as the point M, until the point M moves to the point D; wherein all the trajectories and extended lines thereof in the vehicle moving trajectory image which intersect with the sides $l_1$ and $l_2$ and the sides $l_1$ and $l_3$ are completely searched;

(b): supposing that a point P is an arbitrary pixel point of the side BC ($l_2$) ($P\in[B,C)$), setting the point P as a starting point of a searching line segment, wherein all pixel points of the side BC except the point C are selected and denoted as the point P, and connecting the point P to a pixel point M on the sides $l_3$ and $l_4$, as the searching line segment and a searching direction, wherein all the pixel points on the sides $l_3$ and $l_4$ are selected one by one counterclockwise, except the points C and A, and denoted as the point M, until the point M moves to the point A; wherein all the trajectories and extended lines thereof in the vehicle moving trajectory image which intersect with the sides $l_2$ and $l_3$ and the sides $l_2$ and $l_4$ are completely searched;

(c): supposing that a point P is an arbitrary pixel point of the side CD ($l_3$) ($P\in[C,D)$), setting the point P as a starting point of a searching line segment, wherein all pixel points of the side CD except the point D are selected and denoted as the point P, and connecting the point P to a pixel point M on the side $l_4$ as the searching line segment and a searching direction, wherein all the pixel points on the side $l_4$ are selected one by one counterclockwise, except the points D and A, and denoted as the point M, until the point M moves to the point A; wherein all the trajectories and extended lines thereof in the vehicle moving trajectory image which intersect with the sides $l_3$ and $l_4$ are completely searched; and (d): supposing that a point P is an arbitrary pixel point of the side DA ($l_4$) ($P\in[D,A)$), setting the point P as a starting point of a searching line segment, wherein all pixel points of the side DA except the point A are selected and denoted as the point P, and connecting the point P to a pixel point M on the side $l_1$, as the searching line segment and a searching direction, wherein all the pixel points on the side $l_1$ are selected one by one counterclockwise, except the points A and B, and denoted as the point M, until the point M moves to the point B; wherein all the trajectories and extended lines thereof in the vehicle moving trajectory image which intersect with the sides $l_4$ and $l_1$ are completely searched.

So far, all the trajectories in all directions in the vehicle moving trajectory image have been thoroughly searched. It is worth to mention that the trajectories which overlap with the sides $l_1$, $l_2$, $l_3$ and $l_4$ are not included in the above steps (a), (b), (c) and (d), thus the four trajectories overlapping therewith are searched in addition.

Besides the step of searching the moving trajectories in all possible directions within the range of the two-dimensional vehicle moving trajectory image according to the steps (a), (b), (c) and (d) mentioned above, the step (3) further comprises steps of: confirming whether there is the trajectory in the searching direction by setting the matching condition; and if yes, recording the related parameters of the confirmed trajectory into the vehicle detection database for further traffic volume statistics and moving parameters computation.

The step of confirming whether there is the trajectory in the searching direction by setting the matching condition comprises steps of:

while searching in each possible direction in the vehicle moving trajectory image, counting nonzero pixels whose values are 1 in the searching direction and determining whether there is the trajectory by setting the matching condition, wherein the matching condition is that the number of neighboring nonzero pixels close to each other, namely a distance between the neighboring nonzero pixels is less than a certain distance threshold, exceeds a certain number threshold; supposing the distance threshold of the neighboring nonzero pixels as $\Delta L_{th}$, and the number threshold of the neighboring nonzero pixels which satisfy a preset adjacent condition as $m_{th}$; assuming that the number of the nonzero pixels detected in one direction is n, calculating the distances between each two neighboring nonzero pixels $\Delta L_k$ (k=1, 2, . . . , n−1) respectively; counting the number of the neighboring nonzero pixels that satisfy the adjacent condition $\Delta L_k \leq \Delta L_{th}$, and denoting the number of the pixels that satisfy the adjacent condition as m; if $m \geq m_{th}$, which means that the number of the neighboring nonzero pixels in the searching direction satisfies the matching condition, confirming that there is the trajectory in the searching direction; if $m < m_{th}$, which means that the number of the neighboring nonzero pixels in the searching direction fails to satisfy the matching condition, confirming that there is no trajectory in the searching direction.

When it is confirmed that there is the trajectory in the searching direction, the step of recording the related parameters of the confirmed trajectory into the vehicle detection database for the further traffic volume statistics and the moving parameters computation comprises steps of: respectively denoting coordinates of an initial pixel and a terminal pixel which satisfy the adjacent condition $\Delta L_k \leq \Delta L_{th}$ as a starting pixel point $(d_o,t_o)$ and an ending pixel point $(d_e,t_e)$ of an actual moving response trajectory, which respectively indicate an entry location and an exit location of the vehicle relative to the sensing fiber cable; denoting the confirmed trajectory and its extended line which intersects with any two sides of the sides AB, BC, CD and DA at the points P and M as $(d_1,t_1)$ and $(d_2,t_2)$, determining a tilt angle of the confirmed trajectory $\phi$ which is an angle between the trajectory and a positive direction of the horizontal axis, and then obtaining a relative moving speed and a relative moving direction of the vehicle relative to the sensing fiber cable from the tilt angle $\phi$.

The step of obtaining the relative moving speed and the relative moving direction of the vehicle relative to the sensing fiber cable from the tilt angle $\phi$ is shown as follows. Since the time is irreversible, a value of the time t always increases positively. As a result, the relative moving direction of the vehicle relative to the sensing fiber cable in the vehicle moving trajectory image is expressed as pointing from the pixel whose value oft is smaller to the pixel whose value of t is larger. The smaller one of $t_1$ or $t_2$ is denoted as $t_{begin}$, and its corresponding spatial coordinate d is denoted as $d_{begin}$. The larger one of $t_1$ or $t_2$ is denoted as $t_{end}$, and its corresponding spatial coordinate d is denoted as $d_{end}$. The relative moving speed of the vehicle relative to the sensing fiber cable $\mho_f$ is calculated as:

$$\mho_f = \cot\varphi = \frac{\delta d}{\delta t} = \frac{(d_{end} - d_{begin}) \times \varepsilon_d}{(t_{end} - t_{begin}) \times \varepsilon_t}, \quad (1)$$

wherein δd and δt are the moving distance relative to the sensing fiber cable and the corresponding time respectively; $\epsilon_d$ is a distance represented by one horizontal pixel in the vehicle moving trajectory image, whose unit is meter; and $\epsilon_t$ is the time represented by one vertical pixel in the image, whose unit is second. If $\mho_f > 0$, the moving direction of the vehicle is the same with a positive direction of the horizontal axis, and the moving direction is denoted as "+". It means that the vehicle moves from a proximal end to a distal end of the sensing fiber cable. If $\mho_f < 0$, the moving direction of the vehicle is opposite to the positive direction of the horizontal axis, and the moving direction is denoted as "−", which means that the vehicle moves from the distal end to the proximal end of the sensing fiber cable.

In the step (3), the step of recording the related parameters of the confirmed trajectory into the vehicle detection database for the further traffic volume statistics and the moving parameters computation further comprises steps of: successively recording the parameters $(d_1,t_1)$, $(d_2,t_2)$, $(d_o,t_o)$, $(d_e, t_e)$, cot $\phi$ and $\mho_f$ of the confirmed trajectory in the searching direction into a first database as shown in Table 1, namely the vehicle detection database. In the vehicle detection database, the detected vehicle trajectories are numbered and the searching circumstance number (I-VI) which the trajectory belongs to are labeled.

The step (4) of according to the parameters in the vehicle detection database, counting the traffic volume and calculating out the actual moving speeds, the actual moving directions, the entry locations and the exit locations of the vehicles on the road is shown as follows.

A line-width of the trajectory obtained by the Φ-OTDR is determined by a spatial resolution thereof, namely its launching pulse width. Normally a line-width of an actual vehicle trajectory is larger than a pixel, thus it is necessary to cluster the detected trajectories in Table 1 in order to exclude a situation that a thick line is determined as several trajectories. The step (4) comprises a step of clustering all the trajectories in the Table 1 which comprises steps of: finding the trajectories whose cot $\phi$ are the same and which appear more than once in the table; computing an Euclidean distance between a first intersecting coordinates of a first record and other records, and determining whether the distance of the adjacent records is less than the pixel number of the system spatial resolution range, which is expressed as a product of an optical pulse width and the velocity that light transmits in fiber, divided by the distance represented by one horizontal pixel; if yes, which means that the first record overlaps with a second record, keeping the first record and deleting the second record; repeating the steps of computing and determining for other records until there is no overlapped trajectories. The step (4) further comprises steps of: after clustering all the confirmed trajectories in the Table 1, statistically obtaining the traffic volume by counting a final number of the trajectories in the Table 1.

The step (4) further comprises steps of: according to a spatial angle relationship between the buried sensing fiber cables and the road, obtaining the actual moving speed and the actual moving direction of the vehicle from the relative moving speed and the relative moving direction of the vehicle relative to the sensing fiber cable in the vehicle trajectory database, which is specifically shown as follows.

Supposing that the vehicle moves from a point O to a point H on the road within a period of time Δt, at a spatial distance of $\Delta d_0$, and a velocity of $\mho_0$, since a point for mapping the vehicle moving response at the point H is a point closest to the point H on the fiber cable, a line which is perpendicular to the sensing fiber cable is marked from the point H, and an intersection point of the line and the sensing fiber cable is denoted as a point R; a segment OR is a distance projection of the actual moving distance onto the sensing fiber cable, which is the relative moving distance of the vehicle relative to the sensing fiber cable, $\Delta d_f$; supposing an angle between OH and OR as θ (θ<90°), which is given when the sensing fiber cables are buried along the road, the actual moving speed of the vehicle relative to the road $\mho_0$ and the relative moving speed of the vehicle relative to the sensing fiber cable $\mho_f$ are respectively obtained as:

$$\mho_0 = \frac{\Delta d_0}{\Delta t},\ \mho_f = \frac{\Delta d_f}{\Delta t}, \tag{2}$$

then, $$\frac{\mho_0}{\mho_f} = \frac{\Delta d_0}{\Delta d_f} = \frac{1}{\cos\theta}; \tag{3}$$

and a relationship between $\mho_0$ and $\mho_f$ from the angle θ between OH and OR is obtained as:

$$\mho_0 = \mho_f \times \frac{\Delta d_0}{\Delta d_f} = \frac{\mho_f}{\cos\theta}. \tag{4}$$

Since θ<90°, cos θ>0, which means $\mho_0$ and $\mho_f$ share the same feature that: if $\mho_0>0$, the actual moving direction relative to the road is denoted as "+", which means that the vehicle moves from a proximal end to the distal end of the road; if $\mho_0<0$, the actual moving direction of the vehicle relative to the road is denoted as "−", which means that the vehicle moves from the distal end to the proximal end of the road. Thereby, the actual moving speed and the actual moving direction of the vehicle relative to the road are thus obtained from the relative moving speed and the relative moving direction of the vehicle relative to the sensing fiber cable, and then recorded into a second database.

The step of obtaining the entry location and the exit location of the vehicle based on the parameters of the trajectories in the first database is shown as follows.

The initial pixel $(d_o,t_o)$ and the terminal pixel $(d_e,t_e)$ of the actual moving response trajectory recorded in the first database are converted to specific locations of the vehicle relative to the sensing fiber cable. Since the time is irreversible, the value of the time always increases positively. As a result, the relative moving direction of the vehicle relative to the sensing fiber cable in the vehicle moving trajectory image is expressed as a vector which points from the pixel whose value oft is smaller to the pixel whose value oft is larger. The smaller one of $t_o$ or $t_e$ is denoted as $t_{fbegin}$, and its corresponding spatial coordinate d is denoted as $d_{fbegin}$. The larger one of $t_o$ or $t_e$ is denoted as $t_{fend}$, and its corresponding spatial coordinate d is denoted as $d_{fend}$. Then the relative entry location and the relative exit location of the vehicle relative to the sensing fiber cable $D_{fo}$ and $D_{fe}$ are obtained as:

$$D_{fo}=\epsilon_d \times d_{fbegin},\ D_{fe}=\epsilon_d \times d_{fend} \tag{5};$$

finally, the actual entry location and the actual exit location of the vehicle $D_{0o}$ and $D_{0e}$ are obtained by referring to a table which maps the relationship of the locations of the sensing fiber cable and the road, and then recorded into the second database which is for recording the actual moving speed, the actual moving direction, the actual entry location and the actual exit location of all the vehicles relative to the road.

The present invention provides the online traffic volume monitoring system based on the phase-sensitive optical time domain reflectometry and a monitoring method thereof. The spared fiber in the optical communication cable, which is buried alongside the road, is connected into the Φ-OTDR, for sensing the ambient vibration caused by the vehicles passing by along the fiber length based on the sensing principle of the phase-sensitive optical time domain reflectometry. The monitoring method comprises steps of: obtaining the curve of the responses of the vibrations caused by the vehicles moving or passing by along the sensing fiber cable at the certain moment by differentiating the optical time domain reflection trajectories at the certain moment and a previous moment therebefore; by accumulating the responses of the vibrations along the whole fiber length for the certain period of time, which is determined by the unit statistic period of the traffic volume, so as to obtain the two-dimensional matrix with the temporal and spatial axes, which forms the vehicle moving temporal-spatial response graph; obtaining the moving vehicle trajectory image by binarizing and pre-processing the vehicle moving temporal-spatial response graph; extracting all possible trajectories from the vehicle moving temporal-spatial response graph, and obtaining the traffic volume at each section of the sensing fiber cables by counting the number of the trajectories in one unit monitoring period; and estimating out the actual moving speed, the actual moving direction, and the locations of each the vehicle in real time from the tilt angle, the spatial location and other parameters of the extracted trajectory.

Compared with conventional arts, the monitoring system of the present invention is able to monitor an area with a wide range of dozens of kilometers with quite low cost. The sensing fiber cables have advantages of being passive at a sensing end, not being affected by weather, climate or light condition, and have higher sensitivity and longer lifetime compared with conventional electrical sensor networks. Besides, the monitoring system of the present invention monitors the traffic volume by using the spared fiber in the fiber communication cables buried along the road, which does not need fiber laying engineering work and thus has convenient construction and simple maintenance.

(a) The vehicle moving temporal-spatial response graph of a single vehicle moving from a certain location;

(b) The vehicle moving temporal-spatial response graph of multiple vehicles moving from different locations; and (c) The vehicle moving temporal-spatial response graph of multiple vehicles moving across the same road segments.

Figure 4:
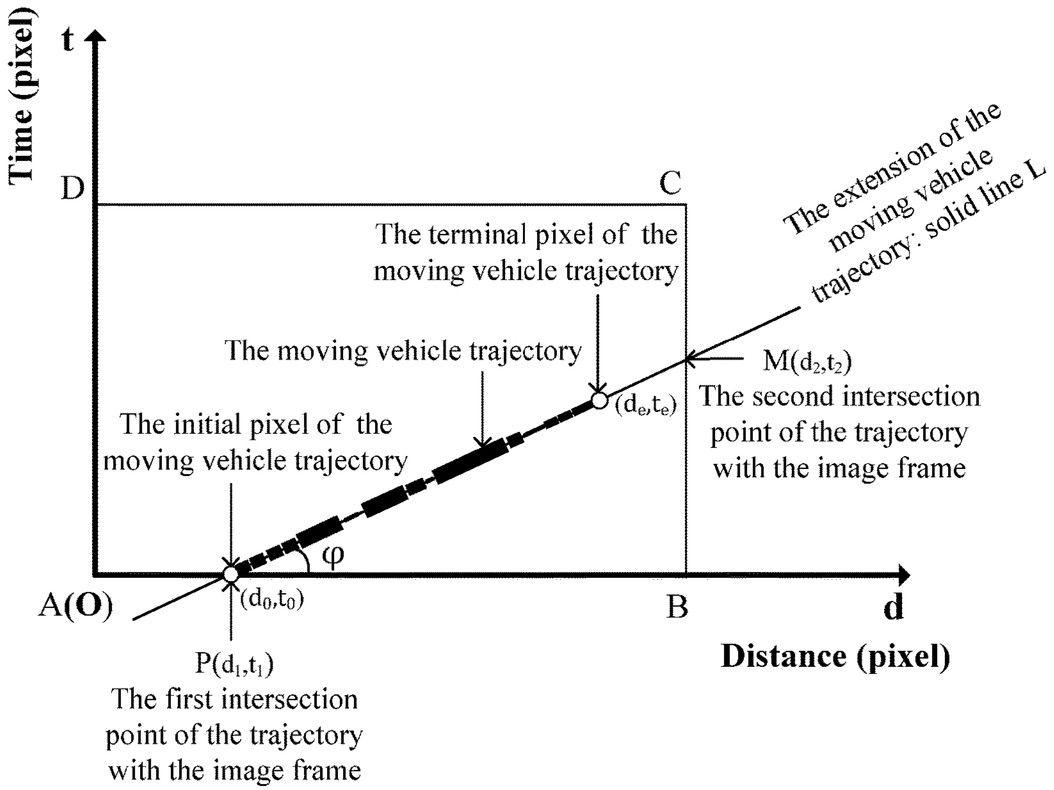

FIG. 4 shows a vehicle moving trajectory image converted from the vehicle moving temporal-spatial response graph in the present invention.

Figure 5:
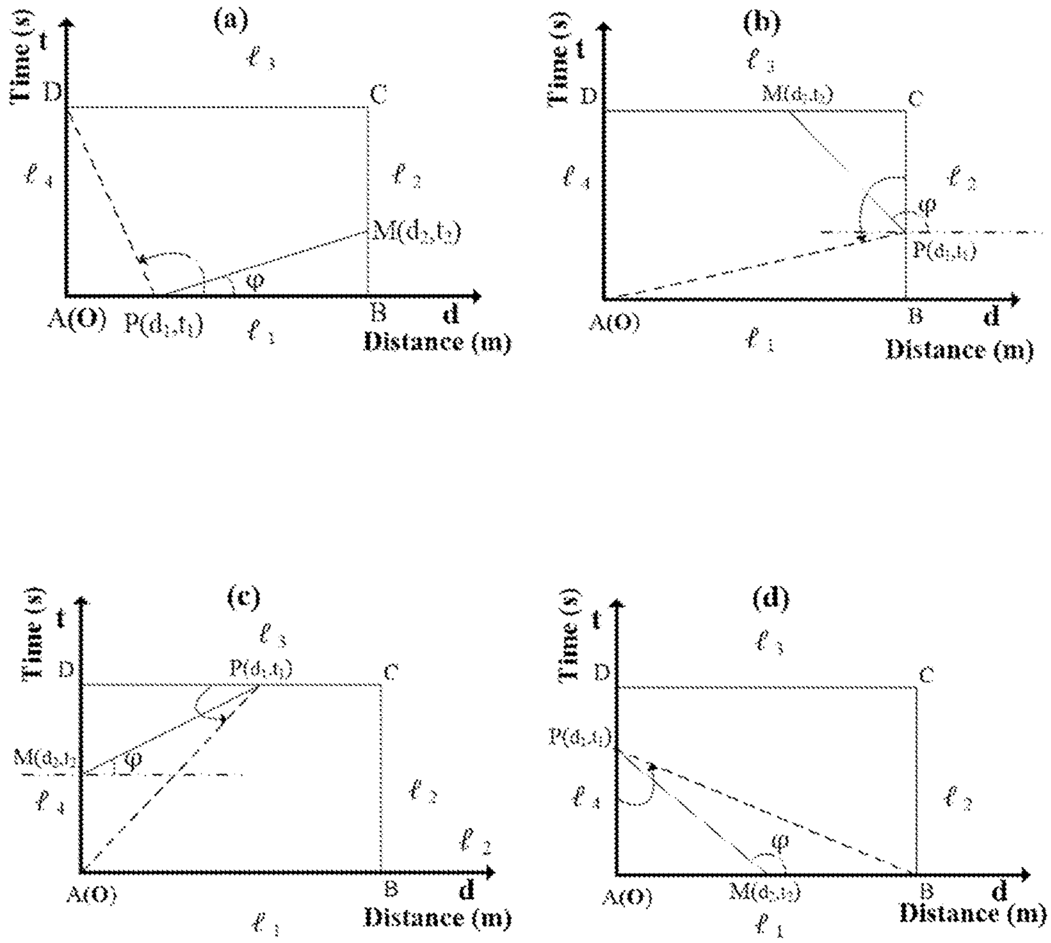

FIG. 5 is a schematic diagram of searching trajectories in all possible directions in the present invention;

(a) The schematic diagram of searching the trajectories intersecting with sides $l_1$ and $l_2$ and sides $l_1$ and $l_3$;

(b) The schematic diagram of searching the trajectories intersecting with sides $l_2$ and $l_3$ and sides $l_2$ and $l_4$;

(c) The schematic diagram of searching the trajectories intersecting with sides $l_3$ and $l_4$; and (d) The schematic diagram of searching the trajectories intersecting with sides $l_4$ and $l_1$.

Figure 6:
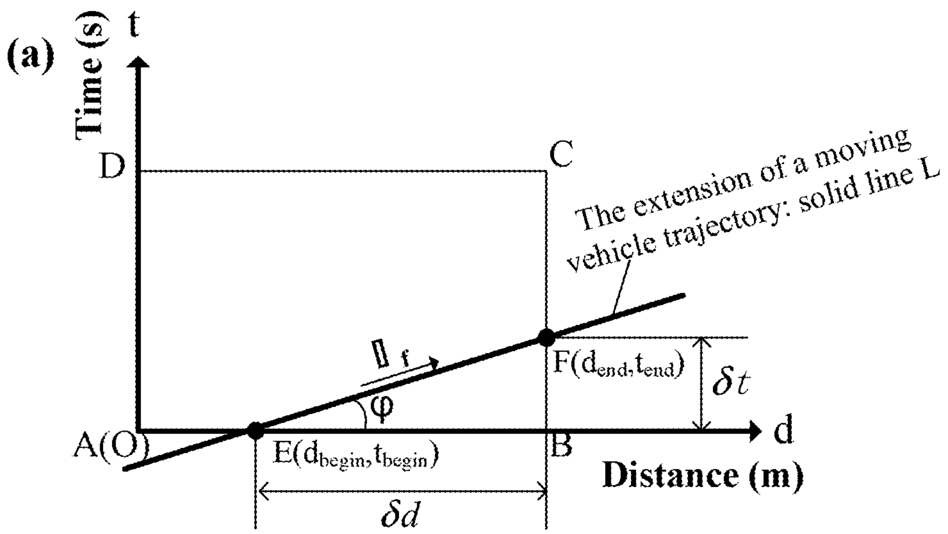
Figure 6:
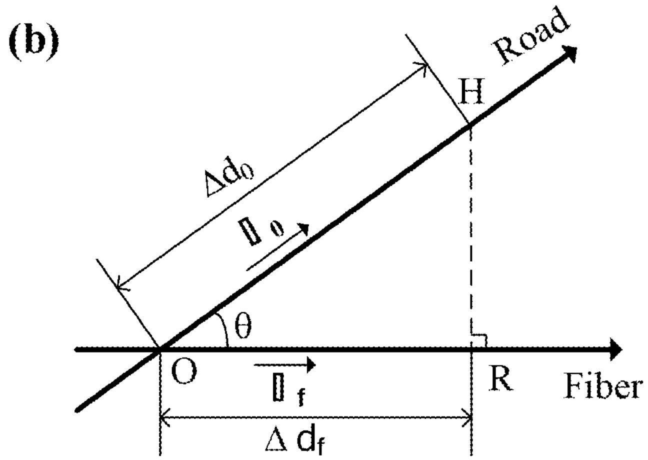

FIG. 6 is a schematic diagram of determining parameters of a vehicle based on detected trajectories in the present invention;

(a) The diagram of determining relative parameters of the vehicle relative to a sensing fiber cable; and (b) The diagram of determining actual parameters of the vehicle relative to a road.

DETAILED DESCRIPTION OF THE PREFERRED EMBODIMENT

Figure 1:
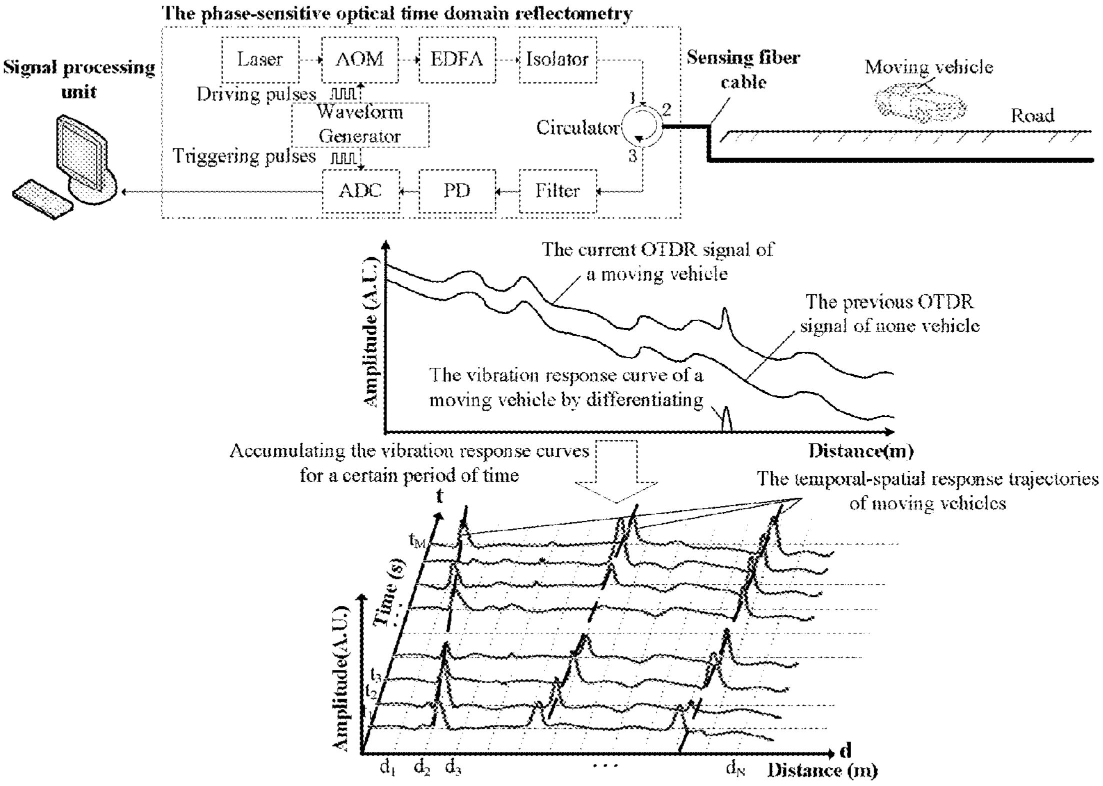
FIG. 1 is a diagram of an online traffic volume monitoring system based on a phase-sensitive optical time domain reflectometry and sensing principles thereof in the present invention.

The present invention provides an online traffic volume monitoring system based on a phase-sensitive optical time domain reflectometry and a monitoring method thereof. According to a first preferred embodiment of the present invention, a diagram of the monitoring system and its sensing principles are shown in FIG. 1. A spared fiber in an optical communication cable, buried along a road, is connected into a phase-sensitive optical time domain reflectometry (Φ-OTDR). The monitoring system of the present invention comprises: sensing fiber cables which are buried along the road, an optical signal demodulator which is the Φ-OTDR, and a signal processing unit. The optical signal demodulator, a core of the monitoring system, comprises optical and electrical devices. The optical signal demodulator comprises an ultra-narrow line-width laser, an acousto-optic modulator (AOM), an erbium-doped fiber amplifier (EDFA), an optical isolator, a circulator, an optical filter, a photoelectric detector (PD), an analog-digital converter (ADC) and a waveform generator. A continuous coherent light generated from the ultra-narrow line-width laser is modulated to an optical pulse signal by the AOM, then the optical pulse signal is amplified by the EDFA and then gated into the sensing fiber cable through the optical isolator and then through the circulator from a port 1 to a port 2. Rayleigh scattering light is generated when the optical pulse signal transmits through the sensing fiber cable. Backscattered Rayleigh light comes back through the circulator from the port 2 to a port 3 and is then filtered by the optical filter to eliminate noises. A coherent optical time domain reflection signal, namely an OTDR track, is obtained after a photoelectric conversion by the PD, and then converted into a digital signal by the ADC. The digital signal is then transmitted into the signal processing unit through a network interface in real time. Periodic pulse signals are generated by the waveform generator, which are used as driving signals of the AOM for modulating the continuous coherent light generated by the ultra-narrow line-width laser into the optical pulse signal and also used as triggering signals of the ADC for periodically acquiring the optical time domain reflection signal simultaneously. Preferably, the monitoring system further comprises a distributed amplifier, e.g. Raman amplifier, according to practical monitoring distance requirements. The signal processing unit is generally a personal computer (PC), for analyzing and processing the optical time domain reflection signals, and extracting vibration and other physical quantities along the sensing fiber cables with specific signal processing algorithms. The sensing fiber cable is made of ordinary single-mode optical communication cable, which is buried parallel to or at any angle (except 90°) with the road according to the practical application requirements. The sensing fiber cables are capable of detecting the vibration caused by moving vehicles to realize the traffic volume monitoring. As shown in FIG. 1, the monitoring system detects changes of backscattered Rayleigh light interference fringes at different time which is an optical time domain reflection track or the OTDR track, so as to detect and locate the vibration caused by the moving vehicles. Furthermore, moving speeds, moving directions, locations of the vehicles, and a traffic volume are all obtained in real time from the vibration temporal-spatial response curves and vehicle moving trajectories.

Figure 2:
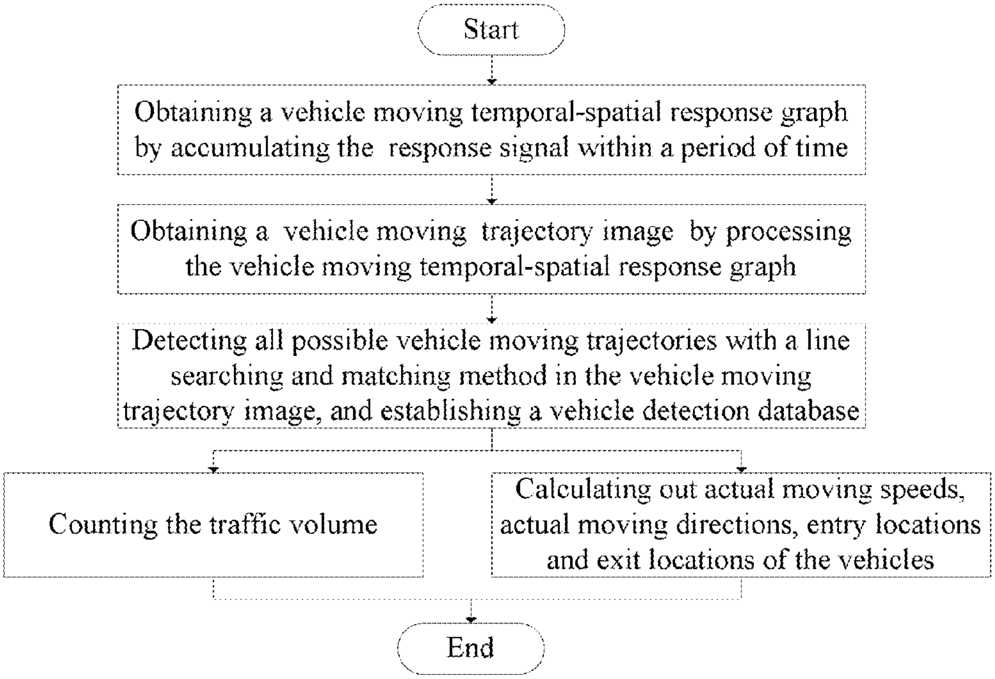
FIG. 2 is a flow diagram of an online traffic volume monitoring method based on the phase-sensitive optical time domain reflectometry in the present invention.

According to a second preferred embodiment of the present invention, referring to FIG. 2, an online traffic volume monitoring method based on the phase-sensitive optical time domain reflectometry comprises the following steps.

(1) Differentiating optical time domain reflection tracks (the OTDR tracks) at neighboring moments to obtain a response signal of vibrations caused by moving vehicles at a certain moment, accumulating the response signal within a period of time to obtain a vehicle moving temporal-spatial response graph which varies spatially and temporally.

Figure 3:
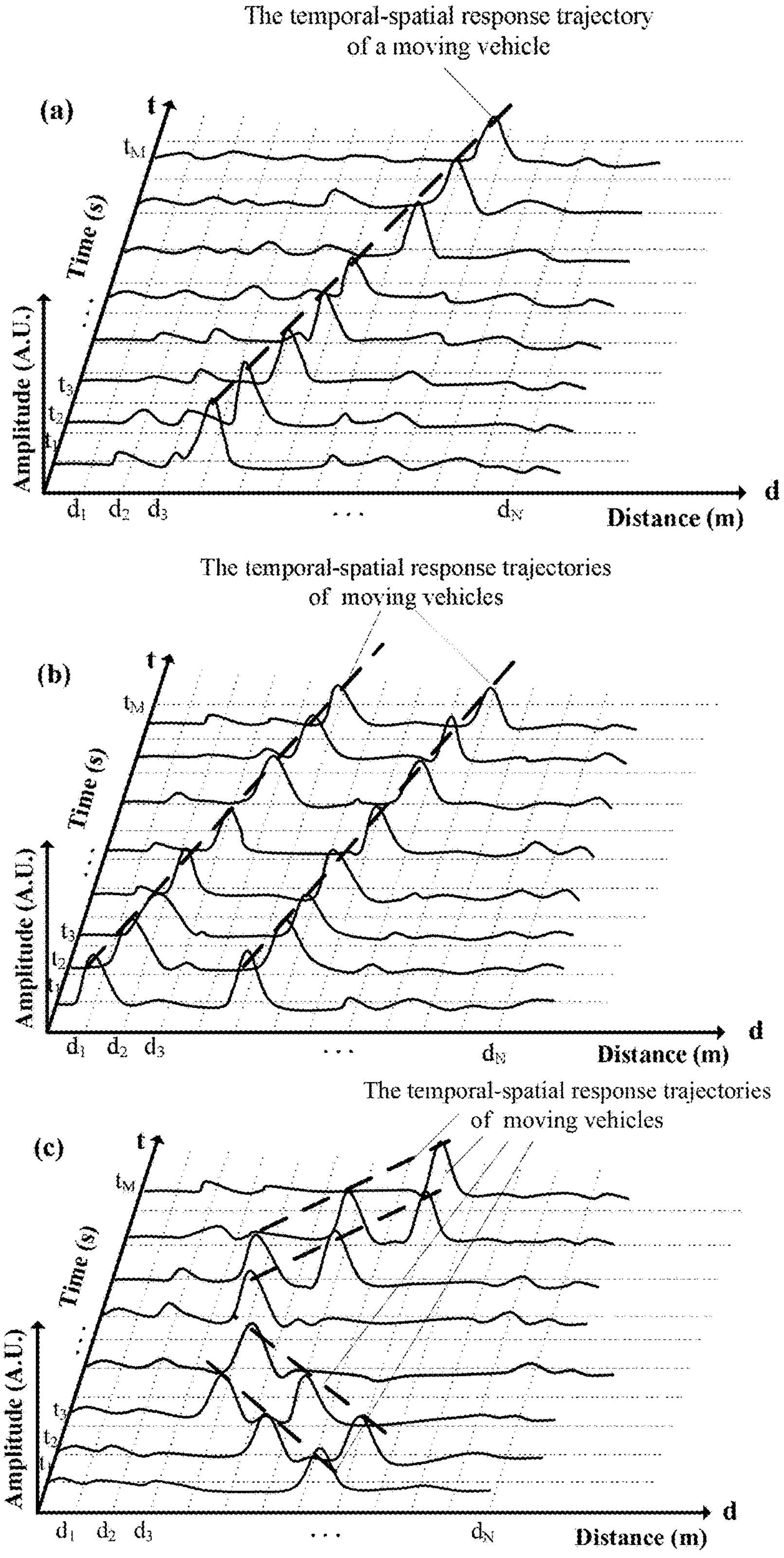
FIG. 3 shows vehicle moving temporal-spatial response graphs by accumulating vibration responses in one traffic volume unit statistic period in the present invention.

According to a third preferred embodiment of the present invention, the step (1) comprises steps of:

obtaining a curve of responses of the vibrations caused by vehicles moving or passing by at a certain moment by differentiating the OTDR tracks at the certain moment and a moment there before; accumulating the responses of the vibrations along a whole fiber length for the period of time, which is determined by a unit statistic period of traffic volume, so as to obtain a two-dimensional matrix with temporal and spatial axes, which forms the vehicle moving temporal-spatial response graph. As shown in FIG. 3, each moving vehicle generates a unique trajectory in the graph because different vehicles cross or enter the same road intersections or segments at different time. Three typical cases of a single vehicle moving at a certain location, multiple vehicles moving at different locations and multiple vehicles moving at the same locations are illustrated in FIGS. 3 (*a*), (*b*) and (*c*) respectively, in which an amplitude of the vibration response caused by the moving vehicles is larger than the amplitude caused by random noises. Then the traffic volume is obtained by detecting a total number of trajectories from the vehicle moving temporal-spatial response graph; and a moving speed, a moving direction, and locations of each vehicle are determined by a tilt angle and spatial locations of the detected trajectory.

(2) processing the vehicle moving temporal-spatial response graph within the unit statistic period of the traffic volume with binarizing and pre-treatments which comprises an image denoising, an edge sharpening and a target enhancement, and then obtaining a vehicle moving trajectory image.

According to a fourth preferred embodiment of the present invention, the step (2) comprises steps of:

according to difference in the amplitude of the responses of the vibrations caused by the vehicles and the amplitude of the response of the noises, selecting an appropriate threshold according to background noises, converting the vehicle moving temporal-spatial response graph into a binary image; pre-processing the binary image with the image denoising which comprises an image dilation and filtering, the edge sharpening, and the target enhancement, so as to obtain the vehicle moving trajectory image.

Referring to FIG. 4, in the vehicle moving trajectory image, a horizontal axis represents a spatial distribution of the fiber length, and a vertical axis represents an accumulation time; zero pixels whose value is zero are denoted as the background noises, and nonzero pixels whose value is 1 are the vibration responses of larger amplitudes caused by moving vehicles; the nonzero pixels form the vehicle moving trajectory. A solid line L is determined by the discontinuous nonzero pixels in a certain direction as shown in FIG. 4. Each moving vehicle generates a unique trajectory in the graph which means that each trajectory represents one vehicle passing by. A cotangent value of an angle between the solid line L and a positive direction of the horizontal axis d is equal to a moving speed of the vehicle relative to the sensing fiber cable, which is obtained by dividing the moving distance by the time duration. The moving direction of the vehicle is represented by a positive/negative sign of the cotangent value of the solid line L. An initial pixel and a terminal pixel of an actual moving response trajectory correspond to the vehicle location along the sensing fiber cable. A traffic volume at each section of the sensing fiber cable is obtained by counting the number of the trajectories in one unit monitoring period.

(3) At discontinuous pixel points in an arbitrary direction of the vehicle moving trajectory image, detecting all possible vehicle moving trajectories with a line searching and matching method; establishing a vehicle detection database with parameters of the detected vehicle moving trajectories.

Due to the discontinuity of the nonzero pixels, the vehicle trajectory is hard to be detected by conventional line detection method. According to a fifth preferred embodiment of the present invention, the step of "at discontinuous pixel points in an arbitrary direction of the vehicle moving trajectory image, detecting all possible vehicle moving trajectories with a line searching and matching method" comprises steps of:

determining sizes of a horizontal axis and a vertical axis of the vehicle moving trajectory image according to a monitoring distance and a statistic time span, so as to obtain a two-dimensional vehicle moving trajectory image; according to the sizes of the horizontal axis and the vertical axis, searching moving trajectories in all possible directions within a range of the two-dimensional vehicle moving trajectory image; confirming whether there is a trajectory which matches with a preset matching condition in each searching direction; if yes, obtaining a confirmation result that there is the trajectory in the searching direction, and recording related parameters of the confirmed trajectory in the searching direction into the vehicle detection database, as results of the searching and the confirming of the trajectory.

According to a sixth preferred embodiment of the present invention, the step of searching the moving trajectories in all possible directions within the range of the two-dimensional vehicle moving trajectory image is shown as follows.

A coordinate system is established in the vehicle moving trajectory image by building a horizontal axis of spatial distance d and a vertical axis of time t; a rectangular window which is the vehicle moving trajectory image is formed by a monitoring distance and a statistic time, wherein the rectangular window has four vertices A, B, C and D; the point A coincides with origin of the axes; a side AB coincides with the horizontal axis; and a side AD coincides with the vertical axis. Sides AB, BC, CD and DA are respectively denoted as $l_1$, $l_2$, $l_3$ and $l_4$, respectively. An extended line of the trajectory in any direction in the vehicle moving trajectory image intersects with two of the sides AB, BC, CD and DA; however, an intersection of the trajectory with the two of the sides varies in the following six circumstances ($C_4^2=6$): I, intersecting with sides $l_1$ and $l_2$; II, intersecting with sides $l_2$ and $l_3$; III, intersecting with sides $l_3$ and $l_4$; IV, intersecting with sides $l_4$ and $l_1$; V, intersecting with sides $l_1$ and $l_3$; VI, intersecting with sides $l_2$ and $l_4$. According to the sixth preferred embodiment of the present invention, the step of searching the moving trajectories in all possible directions within the range of the two-dimensional vehicle moving trajectory image is executed counterclockwise, comprising steps of:

(a): supposing that a point P is an arbitrary pixel point of the side AB ($l_1$) ($P\in[A,B)$), as shown in FIG. 5 (*a*), setting the point P as a starting point of a searching line segment, wherein all pixel points of the side AB except the point B are selected and denoted as the point P, and connecting the point P to a pixel point M on the sides $l_2$ and $l_3$ as the searching line segment and a searching direction, wherein all the pixel points on the sides $l_2$ and $l_3$ are selected one by one counterclockwise, except the points B and D, and denoted as the point M, until the point M moves to the point D; wherein all the trajectories and extended lines thereof in the vehicle moving trajectory image which intersect with the sides $l_1$ and $l_2$ and the sides $l_1$ and $l_3$ are completely searched;

(b): supposing that a point P is an arbitrary pixel point of the side BC ($l_2$) ($P\in[B,C)$), as shown in FIG. 5 (*b*), setting the point P as a starting point of a searching line segment, wherein all pixel points of the side BC except the point C are selected and demoted as the point P, and connecting the point P to a pixel point M on the sides $l_3$ and $l_4$, as the searching line segment and a searching direction, wherein all the pixel points on the sides $l_3$ and $l_4$ are selected one by one counterclockwise, except the points C and A, and denoted as the point M, until the point M moves to the point A; wherein all the trajectories and extended lines thereof in the vehicle moving trajectory image which intersect with the sides $l_2$ and $l_3$ and the sides $l_2$ and $l_4$ are completely searched;

(c): supposing that a point P is an arbitrary pixel point of the side CD ($l_3$) ($P\in[C,D)$), as shown in FIG. 5 (*c*), setting the point P as a starting point of a searching line segment, wherein all pixel points of the side CD except the point D are selected and denoted as the point P, and connecting the point P to a pixel point M on the side $l_4$ as the searching line segment and a searching direction, wherein all the pixel points on the side $l_4$ are selected one by one counterclockwise, except the points D and A, and denoted as the point M, until the point M moves to the point A; wherein all the trajectories and extended lines thereof in the vehicle moving trajectory image which intersect with the sides $l_3$ and $l_4$ are completely searched; and (d): supposing that a point P is an arbitrary pixel point of the side DA ($l_4$) ($P\in[D,A)$), as shown in FIG. 5 (*d*), setting the point P as a starting point of a searching line segment, wherein all pixel points of the side DA except the point A are selected and denoted as the point P, and connecting the point P to a pixel point M on the side $l_1$, as the searching line segment and a searching direction, wherein all the pixel points on the side $l_1$ are selected one by one counterclockwise, except the points A and B, and denoted as the point M, until the point M moves to the point B, wherein all the trajectories and extended lines thereof in the vehicle moving trajectory image which intersect with the sides $l_4$ and $l_1$ are completely searched.

So far, all the trajectories in all directions in the vehicle moving trajectory image have been thoroughly searched. It is worth to mention that the trajectories which overlap with the sides $l_1$, $l_2$, $l_3$ and $l_4$ are not included in the above steps (a), (b), (c) and (d), thus the four trajectories overlapping therewith are searched in addition.

Besides the step of searching the moving trajectories in all possible directions within the range of the two-dimensional vehicle moving trajectory image according to the steps (a), (b), (c) and (d) mentioned above, the step (3) further comprises steps of: confirming whether there is the trajectory in each searching direction by setting a matching condition; and if yes, recording related parameters of the trajectory into a database for further traffic volume statistics and moving parameters computation.

According to a seventh preferred embodiment of the present invention, the step of confirming whether there is the trajectory in the searching direction by setting the matching condition comprises steps of:

while searching in each possible direction in the vehicle moving trajectory image of the sixth preferred embodiment of the present invention, counting the nonzero pixels whose values are 1 in the searching direction and determining whether there is the trajectory by setting the matching condition, wherein the matching condition is that the number of neighboring nonzero pixels which are close to each other, namely a distance between the neighboring nonzero pixels is less than a certain distance threshold, exceeds a certain number threshold; supposing the distance threshold of the neighboring nonzero pixels as $\Delta L_{th}$, and the number threshold of the nonzero pixels which satisfy a preset adjacent condition as $m_{th}$; assuming that the number of the nonzero pixels detected in one direction is n, calculating the distances between each two neighboring nonzero pixels $\Delta L_k$ (k=1, 2, . . . , n−1) respectively; counting the number of the pixels which satisfy the adjacent condition $\Delta L_k \le \Delta L_{th}$, and denoting the number of the pixels which satisfy the adjacent condition as m; if $m \ge m_{th}$, which means that the number of the nonzero pixels in the searching direction satisfies the matching condition, confirming that there is the trajectory detected in the searching direction; if $m < m_{th}$, which means that the number of the nonzero pixels in the searching direction fails to satisfy the matching condition, confirming that there is no trajectory in the searching direction.

When it is confirmed that there is the trajectory detected in the searching direction, the step of recording related parameters of the confirmed trajectory in the searching direction into the vehicle detection database, as the results of the searching and the confirming of the trajectory, comprises steps of: respectively denoting coordinates of an initial pixel and a terminal pixel which satisfy the adjacent condition $\Delta L_k \le \Delta L_{th}$ as a starting pixel point $(d_o,t_o)$ and an ending pixel point $(d_e,t_e)$ of an actual moving response trajectory, which respectively indicate a relative entry location and a relative exit location of the vehicle relative to the sensing fiber cable; denoting the detected trajectory or its extended line which intersects with any two sides of the sides AB, BC, CD and DA at the points P and M as $(d_1,t_1)$ and $(d_2,t_2)$, and determining a tilt angle of the detected trajectory φ which is an angle between the trajectory and a positive direction of the horizontal axis, as shown in FIG. 4 and FIG. 5, and then obtaining the moving speed and the moving direction of the vehicle relative to the sensing fiber cable from the tilt angel φ. Since the time is irreversible, a value of the time t always increases positively. As a result, the moving direction of the vehicle in the vehicle moving trajectory image is expressed as pointing from the pixel whose value oft is smaller to the pixel whose value of t is larger. The smaller one of $t_1$ or $t_2$ is denoted as $t_{begin}$, and its corresponding spatial coordinate d is denoted as $d_{begin}$. The larger one of $t_1$ or $t_2$ is denoted as $t_{end}$, and its corresponding spatial coordinate d is denoted as $d_{end}$. As showed in FIG. 6(*a*), the relative moving speed of the vehicle relative to the sensing fiber cable $\upsilon_f$ is calculated as:

$$\upsilon_f = \cot\varphi = \frac{\delta d}{\delta t} = \frac{(d_{end} - d_{begin}) \times \varepsilon_d}{(t_{end} - t_{begin}) \times \varepsilon_t}, \tag{1}$$

wherein δd and δt are the moving distance relative to the sensing fiber cable and the corresponding time respectively; $\epsilon_d$ is a distance represented by one horizontal pixel in the vehicle moving trajectory image, whose unit is meter, and $\epsilon_t$ is the time represented by one vertical pixel in the image, whose unit is second. If $\upsilon_f > 0$, the moving direction of the vehicle is the same with a positive direction of the horizontal axis, and the moving direction is denoted as "+". It means that the vehicle moves from a proximal end to a distal end of the sensing fiber cable. If $\upsilon_f < 0$, the moving direction of the vehicle is opposite to the positive direction of the horizontal axis, and the moving direction is denoted as "−", which means that the vehicle moves from the distal end to the proximal end of the sensing fiber cable.

In the step (3), the parameters of the detected trajectory $(d_1,t_1)$, $(d_2,t_2)$, $(d_o,t_o)$, $(d_e,t_e)$, cot φ and $\upsilon_f$ are recorded into a first database which is a database of the detected vehicle moving trajectories, as shown in Table 1; wherein the detected vehicle trajectories are numbered and the searching circumstance number (I-VI) which the detected trajectory belongs to are labeled into the first database.

(4) According to the parameters in the vehicle detection database, counting the traffic volume and calculating out actual moving speeds, actual moving directions, entry locations and exit locations of the vehicles on the road.

A line-width of the trajectory obtained by the Φ-OTDR is determined by a spatial resolution thereof, namely its launching pulse width. Normally a line-width of an actual vehicle trajectory is larger than a pixel, thus it is necessary to cluster the detected trajectories in Table 1 in order to exclude a situation that a thick line is determined as several trajectories. According to an eighth preferred embodiment of the present invention, the step (4) comprises a step of clustering all the detected trajectories in the Table 1 which comprises steps of:

finding the trajectories whose cot φ are the same and which appear more than once in the table; computing an Euclidean distance between the first intersecting coordinates of a first record and the first intersecting coordinates of other records, and determining whether the Euclidean distance of the adjacent records is less than the pixel number of the system spatial resolution range, which is expressed as a product of the optical pulse width and the velocity that light transmits in fiber divided by the distance represented by one horizontal pixel; if yes, which means that the first record overlaps with a second record, keeping the first record and deleting the second record; repeating the steps of computing and determining for other records until there is no overlapped trajectories. The step (4) further comprises steps of: after clustering all the detected trajectories in the Table 1, statistically obtaining an actual traffic volume by counting a final number of the trajectories in the Table 1.

According to a ninth preferred embodiment of the present invention, the step (4) further comprises steps of: according to a spatial angle relationship between the buried sensing fiber cable and the road, obtaining the actual moving speed and the actual moving direction of the vehicle relative to the road from the relative moving speed and the relative moving direction of the vehicle relative to the sensing fiber cable in the vehicle trajectory database, which is shown as follows.

Supposing that the vehicle moves from a point O to a point H on the road in a period of time Δt, at a spatial distance of $\Delta d_0$, and a velocity of $\upsilon_0$, as shown in FIG. 6 (*b*), since a point for mapping the vehicle moving response at the point H is a point that is closest to the point H on the fiber cable, a line which is perpendicular to the sensing fiber cable is marked from the point H, and an intersection point of the line and the sensing fiber cable is denoted as a point R. A segment OR is a distance projection of the actual moving distance onto the sensing fiber cable, which is the moving distance of the vehicle relative to the sensing fiber cable, $\Delta d_f$; supposing an angle between OH and OR as θ (θ<90°), which is given when the sensing fiber cable is buried along the road, the actual moving speed of the vehicle relative to the road $\upsilon_0$ and the relative moving speed of the vehicle relative to the sensing fiber cable $\upsilon_f$ are respectively obtained as:

$$\upsilon_0 = \frac{\Delta d_0}{\Delta t}, \upsilon_f = \frac{\Delta d_f}{\Delta t}; \tag{2}$$

then, $$\frac{\upsilon_0}{\upsilon_f} = \frac{\Delta d_0}{\Delta d_f} = \frac{1}{\cos\theta}; \tag{3}$$

and a relationship between $\upsilon_0$ and $\upsilon_f$ is obtained from the angle θ between OH and OR as:

$$\upsilon_0 = \upsilon_f \times \frac{\Delta d_0}{\Delta d_f} = \frac{\upsilon_f}{\cos\theta}. \tag{4}$$

Since θ<90°, cos θ>0, which means $\upsilon_0$ and $\upsilon_f$ share the same feature that: if $\upsilon_0>0$, the actual moving direction of the vehicle relative to the road is denoted as "+". It means that the vehicle moves from a proximal end to a distal end of the road; if $\upsilon_0<0$, the actual moving direction of the vehicle relative to the road is denoted as "−", which means that the vehicle moves from the distal end to the proximal end of the road. Thereby, the actual moving speed and the actual moving direction of the vehicle relative to the road are obtained from the moving speed and the moving direction of the vehicle relative to the sensing fiber cable, and then recorded into a second database as shown in Table 2.

According to a tenth preferred embodiment of the present invention, the step of obtaining the actual entry location and the actual exit location of the vehicle relative to the road based on the parameters of the trajectories in the first database is shown as follows. The initial pixel $(d_o,t_o)$ and the terminal pixel $(d_e,t_e)$ of the actual traffic response trajectory recorded in the Table 1 are converted to specific locations of the vehicle relative to the sensing fiber cable. Similar to the seventh preferred embodiment, since time is irreversible and the value of the time always increases positively, the moving direction of the vehicle relative to the sensing fiber cable in the vehicle moving trajectory image is expressed as a vector which points from the pixel whose value oft is smaller to the pixel whose value of t is larger. The smaller one of $t_o$ or $t_e$ is denoted as $t_{fbegin}$, and its corresponding spatial coordinate d is denoted as $d_{fbegin}$. The larger one of $t_o$ or $t_e$ is denoted as $t_{fend}$, and its corresponding spatial coordinate d is denoted as $d_{fend}$. And then the relative entry location and the relative exit location of the vehicle relative to the sensing fiber cable $D_{fo}$ and $D_{fe}$ are obtained as:

$$D_{fo} = \varepsilon_d \times d_{fbegin},\ D_{fe} = \varepsilon_d \times d_{fend}. \tag{5}$$

Finally, the actual entry location and the actual exit location of the vehicle $D_{0o}$ and $D_{0e}$ are obtained by referring to a table which maps the relationship of the locations of the sensing fiber cable and the actual road positions, and then recorded in Table 2. The actual moving speed, the actual moving direction, the actual entry location and the actual exit location of all the detected vehicles relative to the road are all collected in Table 2.

So far, the present invention has completed the whole online monitoring of the traffic volume, and an automatic detection of the moving speeds, the moving directions, and the locations of the vehicle passing by.

TABLE 1 first database (vehicle detection database: parameters of the vehicle moving trajectories related to sensing fiber cable)

| Record Number | Searching Circumstance Number | coordinates of intersection point 1 of trajectory or its extended line with image | coordinates of intersection point 2 of trajectory or its extended line with image | coordinates of initial pixel of actual moving response trajectory | coordinates of terminal pixel of actual moving response trajectory | cotangent function of title angle | relative moving speed |
|---|---|---|---|---|---|---|---|
| 1 | I | $(d_1, t_1)$ | $(d_2, t_2)$ | $(d_0, t_0)$ | $(d_e, t_e)$ | cot φ | $\upsilon_0$ |
| 2 | I | $(d_1, t_1)$ | $(d_2, t_2)$ | $(d_0, t_0)$ | $(d_e, t_e)$ | cot φ | $\upsilon_0$ |
| 3 | II | $(d_1, t_1)$ | $(d_2, t_2)$ | $(d_0, t_0)$ | $(d_e, t_e)$ | cot φ | $\upsilon_0$ |
| 4 | II | $(d_1, t_1)$ | $(d_2, t_2)$ | $(d_0, t_0)$ | $(d_e, t_e)$ | cot φ | $\upsilon_0$ |
| 5 | III | $(d_1, t_1)$ | $(d_2, t_2)$ | $(d_0, t_0)$ | $(d_e, t_e)$ | cot φ | $\upsilon_0$ |
| 6 | IV | $(d_1, t_1)$ | $(d_2, t_2)$ | $(d_0, t_0)$ | $(d_e, t_e)$ | cot φ | $\upsilon_0$ |
| ... | ... | ... | ... | ... | ... | ... | ... |

TABLE 2 second database (moving parameters of vehicle moving trajectory relative to road)

| Number | actual moving speed relative to road | actual moving direction relative to road | actual entry location | actual exit location |
|---|---|---|---|---|
| 1 | $\upsilon_0$ | + or − | $D_{0o}$ | $D_{0e}$ |
| 2 | $\upsilon_0$ | + or − | $D_{0o}$ | $D_{0e}$ |

TABLE 2-continued

| second database (moving parameters of vehicle moving trajectory relative to road) | | | | |
|---|---|---|---|---|
| Number | actual moving speed relative to road | actual moving direction relative to road | actual entry location | actual exit location |
| 3 | $\upsilon_0$ | + or − | $D_{0o}$ | $D_{0e}$ |
| . . . | . . . | . . . | . . . | . . . |

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claim.

What is claimed is:

1. An online traffic volume monitoring system based on a phase-sensitive optical time domain reflectometry, comprising: sensing fiber cables buried along a road, a phase-sensitive optical time domain reflectometry and a signal processing unit; wherein the phase-sensitive optical time domain reflectometry comprises an ultra-narrow line-width laser, an acousto-optic modulator (AOM), an erbium-doped fiber amplifier (EDFA), an optical isolator, a circulator, an optical filter, a photoelectric detector (PD), an analog-digital converter (ADC) and a waveform generator;

wherein the ultra-narrow line-width laser generates a continuous coherent light; the AOM modulates the continuous coherent light into an optical pulse signal; the optical pulse signal is amplified by the EDFA and then gated into the sensing fiber cable through the optical isolator and the circulator from a first port to a second port; Rayleigh scattering light is generated when the optical pulse signal is transmitting through the sensing fiber cable, wherein backscattered Rayleigh optical signal returns through the second port to a third port of the circulator and then is filtered by the optical filter to eliminate noise; after a photoelectric conversion by the PD, an analog optical time domain reflection signal is obtained and then converted into a digital signal by the ADC; the digital signal is then transmitted into the signal processing unit in real time; the waveform generator is for generating periodic pulse signals which are used as driving signals of the AOM for modulating the continuous coherent light, outputted by the ultra-narrow line-width laser, into the optical pulse signal, and also used as triggering signals of the ADC for periodically acquiring the optical time domain reflection signal simultaneously.

2. An online traffic volume monitoring method based on a phase-sensitive optical time domain reflectometry, comprising steps of: detecting cable vibration caused by vehicles passing by alongside a whole length of sensing fiber cables; accumulating corresponding responses of the cable vibrations at different moments at a temporal axis into a vehicle moving trajectory image; searching trajectories in the vehicle moving trajectory image, detecting the trajectories and determining parameters of the trajectories; obtaining a traffic volume, moving speeds, moving directions and locations of the vehicles.

3. The online traffic volume monitoring method based on the phase-sensitive optical time domain reflectometry, as recited in claim 2, comprising steps of:

(1) differentiating optical time domain reflection tracks at neighboring moments to obtain a response signal of vibrations caused by moving vehicles at a certain moment, accumulating the response signal within a period of time to obtain a vehicle moving temporal-spatial response graph which varies spatially and temporally;

(2) processing the vehicle moving temporal-spatial response graph which is obtained by the step (1), within a unit statistic period of traffic volume, with binarizing and pre-treatments which comprises an image denoising, an edge sharpening and a target enhancement, and then obtaining a vehicle moving trajectory image;

(3) at discontinuous pixel points in an arbitrary direction of the vehicle moving trajectory image which is obtained by the step (2), detecting all possible vehicle moving trajectories with a line searching and matching method; establishing a vehicle detection database with parameters of the detected vehicle moving trajectories; and (4) according to the parameters in the vehicle detection database which is obtained by the step (3), counting the traffic volume and calculating out actual moving speeds, actual moving directions, entry locations and exit locations of the vehicles on a road.

4. The online traffic volume monitoring method based on the phase-sensitive optical time domain reflectometry, as recited in claim 3, wherein the step (1) comprises steps of: differentiating the optical time domain reflection tracks at the neighboring moments of the phase-sensitive optical time domain reflectometry to obtain a curve of responses of the vibrations caused by the vehicles moving or passing by along the sensing fiber cables at the moment; by accumulating the responses of the vibrations for the period of time, obtaining a two-dimensional matrix with temporal and spatial axes, namely the vehicle moving temporal-spatial response graph.

5. The online traffic volume monitoring method based on the phase-sensitive optical time domain reflectometry, as recited in claim 3, wherein the step (2) comprises steps of: according to different response amplitudes of the vibrations caused by the vehicles and noises, selecting an appropriate threshold according to an amplitude of a background noise, converting the vehicle moving temporal-spatial response graph into a binary image; pre-processing the binary image with the image denoising, the edge sharpening and the target enhancement, so as to obtain the vehicle moving trajectory image.

6. The online traffic volume monitoring method based on the phase-sensitive optical time domain reflectometry, as recited in claim 3, wherein the step of "at discontinuous pixel points in an arbitrary direction of the vehicle moving trajectory image which is obtained by the step (2), detecting all possible vehicle moving trajectories with a line searching and matching method" comprises steps of:

determining sizes of a horizontal axis and a vertical axis of the vehicle moving trajectory image according to a monitoring distance and a statistic time span, so as to obtain a two-dimensional vehicle moving trajectory image; according to the sizes of the horizontal axis and the vertical axis, searching moving trajectories in all possible directions within a range of the two-dimensional vehicle moving trajectory image; confirming whether there is a trajectory which matches with a preset matching condition in each searching direction; if yes, obtaining a confirmation result that there is the trajectory in the searching direction, and recording related parameters of the confirmed trajectory in the searching direction into the vehicle detection database, as results of the searching and the confirming of the trajectory;

wherein, in the vehicle moving trajectory image, the horizontal axis represents a spatial distance d and the vertical axis represents a time t; the monitoring distance and the statistic time span form a rectangular window with four vertices A, B, C and D; the point A coincides with an origin of the axes; a side AB coincides with the horizontal axis of the spatial distance, and a side AD coincides with the vertical axis of the time; the side AB and sides BC, CD and DA (i.e., AD) are denoted as $l_1$, $l_2$, $l_3$ and $l_4$, respectively in the rectangular window ABCD; an extended line of the trajectory in an arbitrary direction in the image intersects with two of the sides AB, BC, CD and DA; an intersection of the trajectory with the two of the sides varies in the following six circumstances ($C_4^2=6$): I, intersecting with the sides $l_1$ and $l_2$, intersecting with the sides $l_2$ and $l_3$, III, intersecting with the sides $l_3$ and $l_4$, intersecting with the sides $l_4$ and $l_1$; V, intersecting with the sides $l_1$ and $l_3$, intersecting with the sides $l_2$ and $l_4$, wherein the step of "searching moving trajectories in all possible directions within a range of the two-dimensional vehicle moving trajectory image" comprises steps of:

(a): supposing that a point P is an arbitrary pixel point of the side AB ($l_1$) (P∈[A,B)), setting the point P as a starting point of a searching line segment, wherein all pixel points of the side AB except the point B are selected and denoted as the point P, and connecting the point P to a pixel point M on the sides $l_2$ and $l_3$ as the searching line segment and a searching direction, wherein all the pixel points on the sides $l_2$ and $l_3$ are selected one by one counterclockwise, except the points B and D, and denoted as the point M, until the point M moves to the point D; wherein all the trajectories and extended lines thereof in the vehicle moving trajectory image which intersect with the sides $l_1$ and $l_2$ and the sides $l_1$ and $l_3$ are completely searched;

(b): supposing that a point P is an arbitrary pixel point of the side BC ($l_2$) (P∈[B,C)), setting the point P as a starting point of a searching line segment, wherein all pixel points of the side BC except the point C are selected and denoted as the point P, and connecting the point P to a pixel point M on the sides $l_3$ and $l_4$, as the searching line segment and a searching direction, wherein all the pixel points on the sides $l_3$ and $l_4$ are selected one by one counterclockwise, except the points C and A, and denoted as the point M, until the point M moves to the point A; wherein all the trajectories and extended lines thereof in the vehicle moving trajectory image which intersect with the sides $l_2$ and $l_3$ and the sides $l_2$ and $l_4$ are completely searched;

(c): supposing that a point P is an arbitrary pixel point of the side CD ($l_3$) (P∈[C,D)), setting the point P as a starting point of a searching line segment, wherein all pixel points of the side CD except the point D are selected and denoted as the point P, and connecting the point P to a pixel point M on the side $l_4$ as the searching line segment and a searching direction, wherein all the pixel points on the side $l_4$ are selected one by one counterclockwise, except the points D and A, and denoted as the point M, until the point M moves to the point A; wherein all the trajectories and extended lines thereof in the vehicle moving trajectory image which intersect with the sides $l_3$ and $l_4$ are completely searched;

(d): supposing that a point P is an arbitrary pixel point of the side DA ($l_4$) (P∈[D,A)), setting the point P as a starting point of a searching line segment, wherein all pixel points of the side DA except the point A are selected and denoted as the point P, and connecting the point P to a pixel point M on the side $l_1$, as the searching line segment and a searching direction, wherein all the pixel points on the side $l_1$ are selected one by one counterclockwise, except the points A and B, and denoted as the point M, until the point M moves to the point B; wherein all the trajectories and extended lines thereof in the vehicle moving trajectory image which intersect with the sides $l_4$ and $l_1$ are completely searched; and searching four trajectories which overlap with the sides $l_1$, $l_2$, $l_3$ and $l_4$, the step of "confirming whether there is a trajectory which matches with a preset matching condition in each searching direction" comprises steps of:

while searching in each possible direction, counting nonzero pixels whose values are 1 in the searching direction and determining whether there is the trajectory by setting a matching condition, wherein the matching condition is that the number of neighboring nonzero pixels close to each other, namely a distance between the neighboring nonzero pixels is less than a certain distance threshold, exceeds a certain number threshold; supposing the distance threshold of the neighboring nonzero pixels as $\Delta L_{th}$, and the number threshold of the neighboring nonzero pixels which satisfy a preset adjacent condition as $m_{th}$; assuming that the number of the nonzero pixels detected in one direction is n, calculating the distances between each two neighboring nonzero pixels $\Delta L_k$ (k=1, 2, . . . , n−1) respectively; counting the number of the neighboring nonzero pixels that satisfy the adjacent condition $\Delta L_k \le \Delta L_{th}$, and denoting the number of the pixels that satisfy the adjacent condition as m; if $m \ge m_{th}$, which means that the number of the neighboring nonzero pixels in the searching direction satisfies the matching condition, confirming that there is the trajectory in the searching direction; if $m < m_{th}$, which means that the number of the neighboring nonzero pixels in the searching direction fails to satisfy the matching condition, confirming that there is no trajectory in the searching direction;

after it is confirmed that there is the trajectory in the searching direction, the step of "recording related parameters of the confirmed trajectory in the searching direction into the vehicle detection database, as results of the searching and the confirming of the trajectory" comprises steps of: respectively denoting coordinates of an initial pixel and a terminal pixel which satisfy the adjacent condition $\Delta L_k \le \Delta L_{th}$ as a starting pixel point $(d_o,t_o)$ and an ending pixel point $(d_e,t_e)$ of an actual moving response trajectory, which respectively indicate an entry location and an exit location of the vehicle relative to the sensing fiber cable; denoting the confirmed trajectory and its extended line which intersects with any two sides of the sides AB, BC, CD and DA at the points P and M as $(d_1,t_1)$ and $(d_2,t_2)$, determining a tilt angle of the confirmed trajectory ϕ which is an angle between the trajectory and a positive direction of the horizontal axis, and then obtaining a relative moving speed and a relative moving direction of the vehicle relative to the sensing fiber cable from the tilt angle ϕ;

wherein the step of "obtaining a relative moving speed and a relative moving direction of the vehicle relative to the sensing fiber cable from the tilt angle ϕ" comprises: expressing the relative moving direction of the vehicle relative to the sensing fiber cable in the vehicle moving trajectory image as pointing from the pixel whose value oft is smaller to the pixel whose value oft is larger, wherein the smaller one of $t_1$ or $t_2$ is denoted as $t_{begin}$, and its corresponding spatial coordinate d is denoted as $d_{begin}$; the larger one of $t_1$ or $t_2$ is denoted as $t_{end}$, and its corresponding spatial coordinate d is denoted as $d_{end}$; calculating the relative moving speed of the vehicle relative to the sensing fiber cable $\upsilon_f$ as:

$$\upsilon_f = \cot\varphi = \frac{\delta d}{\delta t} = \frac{(d_{end} - d_{begin}) \times \varepsilon_d}{(t_{end} - t_{begin}) \times \varepsilon_t}, \quad (1)$$

wherein δd and δt are the moving distance relative to the sensing fiber cable and the corresponding time respectively; $\epsilon_d$ is a distance represented by one horizontal pixel in the vehicle moving trajectory image, whose unit is meter; and $\epsilon_t$ is the time represented by one vertical pixel in the image, whose unit is second; if $\upsilon_f>0$, the moving direction of the vehicle is the same with a positive direction of the horizontal axis, and the moving direction is denoted as "+", which means that the vehicle moves from a proximal end to a distal end of the sensing fiber cable; if $\upsilon_f<0$, the moving direction of the vehicle is opposite to the positive direction of the horizontal axis, and the moving direction is denoted as "−", which means that the vehicle moves from the distal end to the proximal end of the sensing fiber cable; and the step of "recording related parameters of the confirmed trajectory in the searching direction into the vehicle detection database, as results of the searching and the confirming of the trajectory" further comprises steps of: successively recording the parameters $(d_1,t_1)$, $(d_2,t_2)$, $(d_o,t_o)$, $(d_e,t_e)$, cot ϕ and $\upsilon_f$ of the confirmed trajectory in the searching direction into a first database, namely the vehicle detection database where the detected vehicle trajectories are numbered and the searching circumstance number (I-VI) which the trajectory belongs to are labeled.

7. The online traffic volume monitoring method based on the phase-sensitive optical time domain reflectometry, as recited in claim 6, wherein: the step (4) comprises a step of: clustering all the trajectories in the first database, comprising steps of: finding the trajectories whose cot ϕ are the same and which appear more than once in the table; computing an Euclidean distance between first intersecting coordinates of a first record and the first intersecting coordinates of other records, and determining whether the Euclidean distance of the adjacent records is less than a pixel number of a system spatial resolution range, which is expressed as a product of an optical pulse width and the velocity that light transmits in fiber, divided by the distance represented by one horizontal pixel; if yes, which means that the first record overlaps with a second record, keeping the first record and deleting the second record; repeating the steps of computing and determining for other records until there is no overlapped trajectories; and the step (4) further comprises a step of: after clustering all the trajectories in the first database, statistically obtaining the traffic volume by counting a final number of the trajectories in the first database.

8. The online traffic volume monitoring method based on the phase-sensitive optical time domain reflectometry, as recited in claim 7, wherein: the step (4) further comprises a step of:

according to a spatial angle relationship between the buried sensing fiber cables and the road, obtaining the actual moving speed and the actual moving direction of the vehicle from the relative moving speed and the relative moving direction of the vehicle relative to the sensing fiber cable in the vehicle trajectory database, comprising steps of:

supposing that the vehicle moves from a point O to a point H on the road within a period of time Δt, at a spatial distance of $\Delta d_0$, and a velocity of $\upsilon_0$, marking a line which is perpendicular to the sensing fiber cable from the point H, and denoting an intersection point of the line and the sensing fiber cable as a point R, wherein a segment OR is a distance projection of the actual moving distance onto the sensing fiber cable, which is the relative moving distance of the vehicle relative to the sensing fiber cable, $\Delta d_f$; supposing an angle between OH and OR as θ (θ<90°), which is given when the sensing fiber cables are buried along the road, respectively obtaining the actual moving speed of the vehicle relative to the road $\upsilon_0$ and the relative moving speed of the vehicle relative to the sensing fiber cable $\upsilon_f$ as:

$$\upsilon_0 = \frac{\Delta d_0}{\Delta t}, \upsilon_f = \frac{\Delta d_f}{\Delta t}, \quad (2)$$

then, $$\frac{\upsilon_0}{\upsilon_f} = \frac{\Delta d_0}{\Delta d_f} = \frac{1}{\cos\theta}; \quad (3)$$

obtaining a relationship between $\upsilon_0$ and $\upsilon_f$ from the angle θ between OH and OR as:

$$\upsilon_0 = \upsilon_f \times \frac{\Delta d_0}{\Delta d_f} = \frac{\upsilon_f}{\cos\theta}; \quad (4)$$

wherein: since θ<90°, cos θ>0, which means $\upsilon_0$ and $\upsilon_f$ share the same feature that: if $\upsilon_0>0$, the actual moving direction relative to the road is denoted as "+", which means that the vehicle moves from a proximal end to the distal end of the road; if $\upsilon_0<0$, the actual moving direction of the vehicle relative to the road is denoted as "−", which means that the vehicle moves from the distal end to the proximal end of the road;

after the actual moving speed and the actual moving direction of the vehicle relative to the road are obtained from the relative moving speed and the relative moving direction of the vehicle relative to the sensing fiber cable, recording the obtained actual moving speed and the obtained actual moving direction of the vehicle relative to the road into a second database;

converting the initial pixel $(d_o,t_o)$ and the terminal pixel $(d_e,t_e)$ of the actual moving response trajectory recorded in the first database into specific locations of the vehicle relative to the sensing fiber cable; expressing the relative moving direction of the vehicle relative to the sensing fiber cable in the vehicle moving trajectory image as a vector which points from the pixel whose value oft is smaller to the pixel whose value oft is larger, wherein the smaller one of $t_o$ or $t_e$ is denoted as $t_{fbegin}$, and its corresponding spatial coordinate d is denoted as $d_{fbegin}$; the larger one of $t_o$ or $t_e$ is denoted as $t_{fend}$; and its corresponding spatial coordinate d is denoted as $d_{fend}$; obtaining the relative entry location and the relative exit location of the vehicle relative to the sensing fiber cable $D_{fo}$ and $D_{fe}$ as:

$$D_{fo}=\epsilon_d \times d_{fbegin},\ D_{fe}=\epsilon_d \times d_{fend} \quad (5);\ \text{and}$$

finally, obtaining the actual entry location and the actual exit location of the vehicle $D_{0o}$ and $D_{0e}$ by referring to a table which maps the relationship of the locations of the sensing fiber cable and the road, and then recording the obtained actual entry location and the obtained actual exit location into the second database which is for recording the actual moving speed, the actual moving direction, the actual entry location and the actual exit location of all the vehicles relative to the road.

* * * * *